United States Patent
Yang et al.

(10) Patent No.: US 7,737,828 B2
(45) Date of Patent: Jun. 15, 2010

(54) TACTILE FEEDBACK DEVICE

(75) Inventors: Tae-Heon Yang, Chungcheongnam-do (KR); Dong-Soo Kwon, Daejeon (KR); Seung-Seob Lee, Daejeon (KR); Nam-Su Yuk, Daege (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 298 days.

(21) Appl. No.: 12/009,382

(22) Filed: Jan. 17, 2008

(65) Prior Publication Data
US 2009/0009301 A1    Jan. 8, 2009

(30) Foreign Application Priority Data
Jul. 3, 2007    (KR) ...................... 10-2007-0066393

(51) Int. Cl.
*H04B 3/36*    (2006.01)
(52) U.S. Cl. ................. 340/407.1; 340/7.6; 340/825.19; 434/112
(58) Field of Classification Search .............. 340/407.1, 340/7.6, 825.19; 345/173, 179, 156; 434/112, 434/113, 114; 341/27
See application file for complete search history.

(56) References Cited

U.S. PATENT DOCUMENTS

| | | | |
|---|---|---|---|
| 6,109,922 A * | 8/2000 | Litschel et al. | 434/114 |
| 6,462,840 B1 * | 10/2002 | Kravtsov | 358/474 |
| 6,639,582 B1 * | 10/2003 | Shrader | 345/156 |
| 7,352,356 B2 * | 4/2008 | Roberts et al. | 345/156 |
| 2002/0080111 A1 * | 6/2002 | Lake et al. | 345/156 |
| 2006/0012576 A1 | 1/2006 | Hafez et al. | |

\* cited by examiner

*Primary Examiner*—Toan N Pham
(74) *Attorney, Agent, or Firm*—TIPS Group

(57) ABSTRACT

The present invention discloses a tactile feedback device for giving realistic touch sensation to the user by stimulating the skin of the user. The tactile feedback device of the present invention comprises a housing having one end positioned near the skin of the user in use, an actuator, touch pins and an elastic means. The actuator is mounted inside the housing to convert electromagnetic energy into kinetic energy. The touch pins are mounted inside the housing so as to pop in and out, and the front end thereof is popped out of one end of the housing to contact the skin, and is connected with the actuator so as to be operated by kinetic energy of the actuator. The elastic plates of the elastic means are mounted between one end of the housing and the actuator, and have the touch pins fixedly passing through so as to be interlocked with the touch pins, and when the touch pins pop in and out, they are elastically deformed to have elastic energy. According to the present invention, the touch pins stimulate the skin of the user by dint of an interlocking structure of the actuator that converts electromagnetic energy into kinetic energy and the elastic means, so it is possible to implement realistic touch sensation.

9 Claims, 10 Drawing Sheets

TACTILE FEEDBACK DEVICE

This application claims priority to Korean Patent Application No. 10-2007-0066393, filed on Jul. 3, 2007, in the Korean Intellectual Property Office, the entire contents of which are hereby incorporated by reference.

BACKGROUND OF THE INVENTION

1. Field of the Invention

The present invention relates to a tactile feedback device, more specifically to a tactile feedback device for giving realistic feeling sensation to the user by stimulating the skin of the user.

2. Description of the Related Art

A haptic device has utilized in various fields such as virtual reality, simulation, wearable computers, robotics and medical use, and it is also called haptic interface. The haptic device is classified into a force feedback device for transmitting physical force to the muscles and joints and a tactile feedback device for transmitting skin stimulation such as texture, temperature, pressure, vibration and pain through mechanoreceptors that are in contact with the skin. The tactile feedback device is also called tactile display. It is important for the tactile feedback device to be provided with tactile technology for embodying realistic force such as the texture of actual body to the user by skin stimulation. In tactile technology, it is known that it is advantageous for idealistic cognition of touch sensation to array the interval between skin stimulating points at 1.3 mm or less.

As an example of tactile feedback device, a multi-layer touch display device is disclosed in U.S. Patent Laid-Open No. 2006/0012576A1. The multi-layer touch display device of this patent document comprises a touch plate, a plurality of tactile sensation modification components having magnetic force, and a plurality of coils. The tactile sensation modification components are mounted so as to operate on the touch plate. The tactile sensation modification components are vibrated according to the direction of the electric current applied to the coils, and the hand and/or finger of the user is stimulated by the vibration of the touch plate. Accordingly, the user can feel the touch sensation of the body displayed on screen.

However in the tactile feedback device of the aforementioned patent document, since the blade of the tactile sensation modification components is manufactured into a large area due to its mechanical structure, the intervals of the points stimulating the skin are far apart, so the problem is that it is insufficient for implementing the tactile sensation. Also, it has a disadvantage that there are many constraints to implementable displacement and force because the coil of the electromagnetic device is of a flat plate type as well as the blade of the tactile sensation modification components is supported on the touch plate by arms.

SUMMARY OF THE INVENTION

The present invention is to solve various problems of the aforementioned prior art with an object to provide a tactile feedback device that can embody realistic touch sensation by an interlocking structure of an actuator that converts electromagnetic energy into kinetic energy and an elastic means.

Another object of the present invention is to provide a tactile feedback device that can be easily miniaturized and improve controllability.

Still another object of the present invention is to provide a low-power and high-output tactile feedback device.

In accordance with the present invention, there is provided a tactile feedback device comprising: a housing which has one end positioned near the skin of the user in use; an actuator which is mounted inside said housing to convert electromagnetic energy into kinetic energy; touch pins which are mounted in such a way that they can pop into and out of said housing, the front ends of which are protruded from one end of said housing to contact the skin of the user, and which are connected to said actuator so as to be operated by kinetic energy of said actuator; and an elastic means which is mounted between one end of said housing and said actuator, into which said touch pins fixedly pass through so as to be interlocked with said touch pins, and which is elastically deformed to have elastic energy when said touch pins are popped into said housing.

BRIEF DESCRIPTION OF THE DRAWINGS

These and other objects, features, aspects, and advantages of the present invention will be more fully described in the following detailed description of preferred embodiments and examples, taken in conjunction with the accompanying drawings. In the drawings.

DETAILED DESCRIPTION OF THE INVENTION

Below will be described a tactile feedback device according to preferred embodiments of the present invention in detail with reference to the accompanying drawings.

Figure 1:
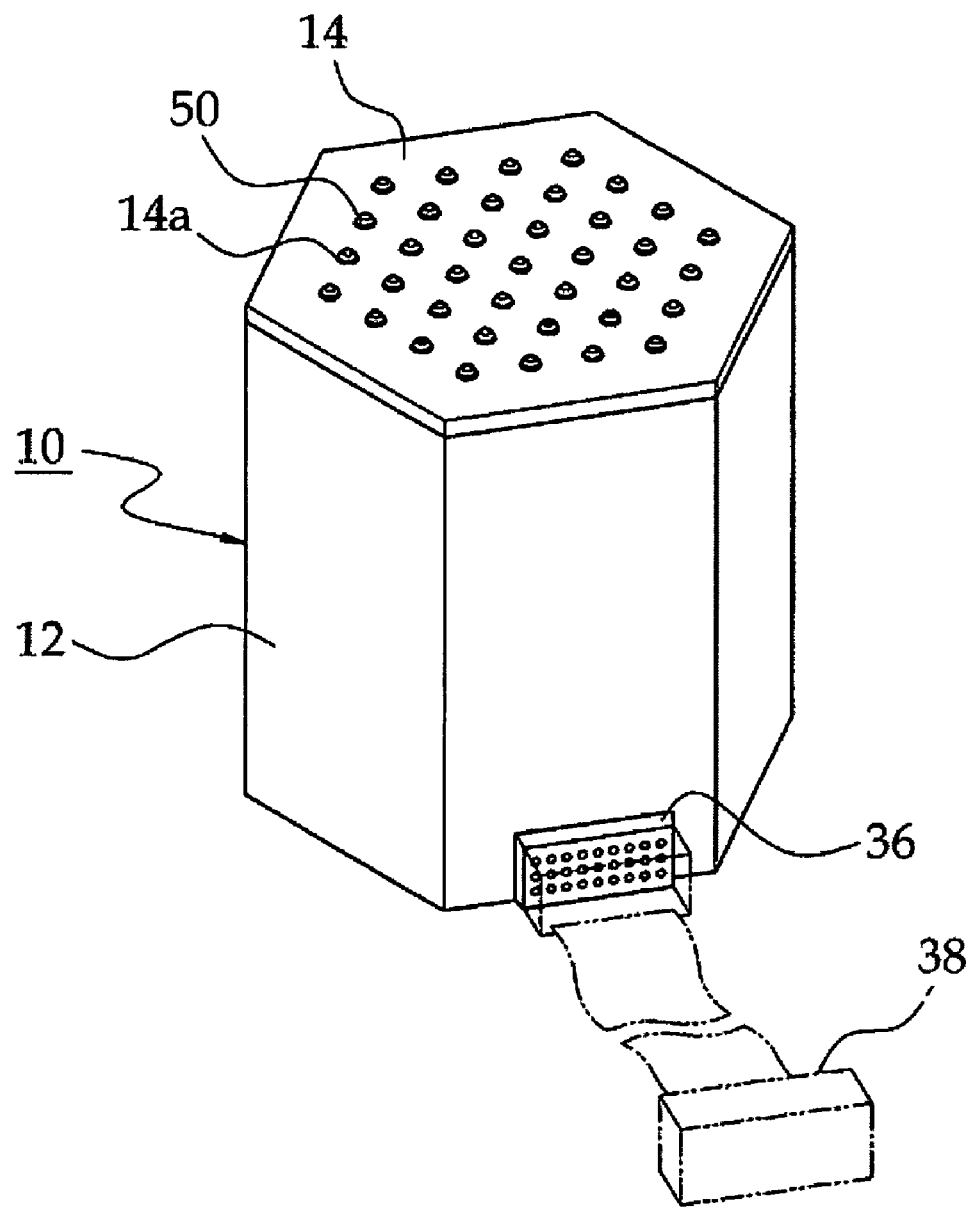
FIG. 1 is a perspective view showing the constitution of a tactile feedback device according to a preferred embodiment of the present invention.
Figure 2:
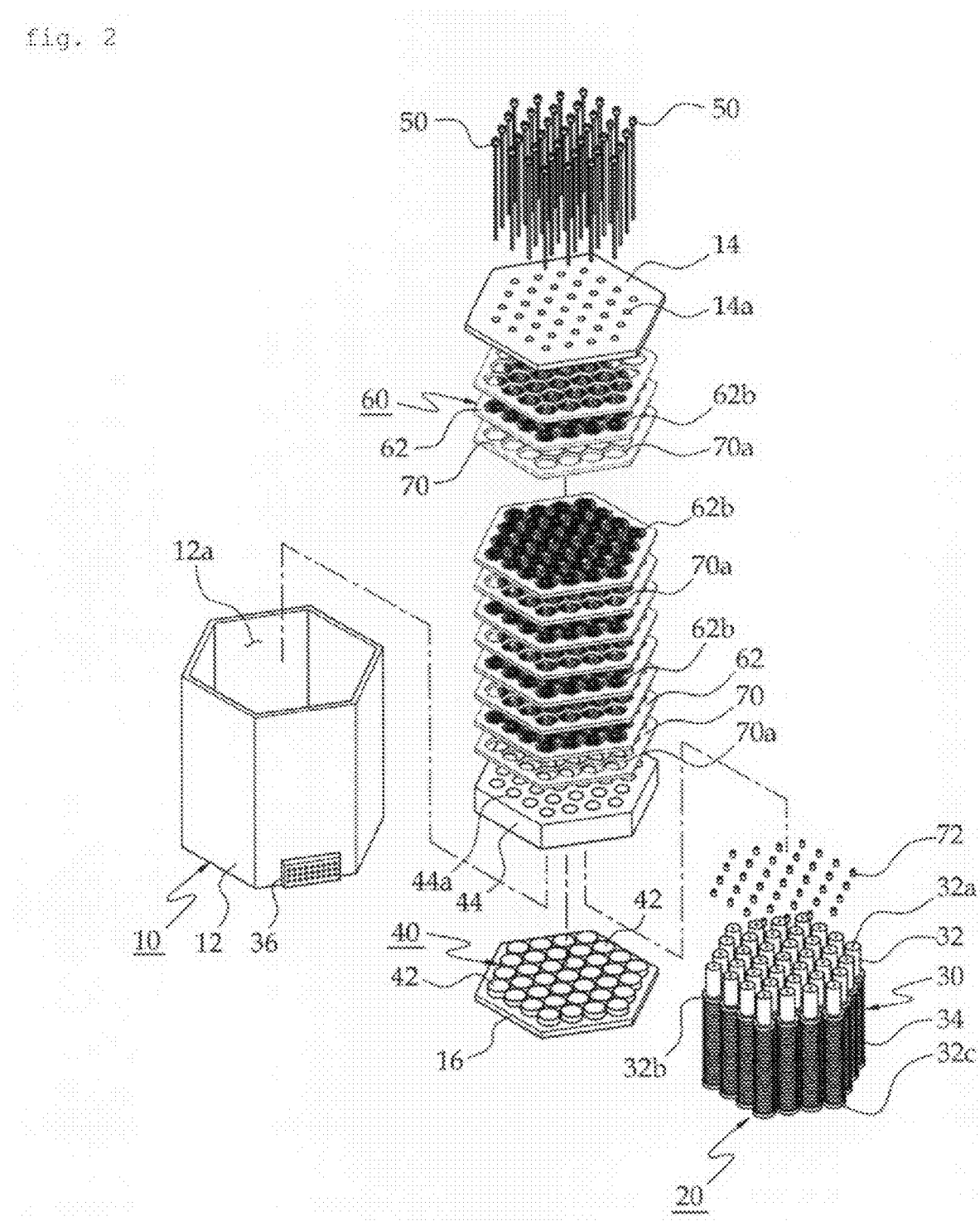
FIG. 2 is an exploded perspective view of the tactile feedback device according to the preferred embodiment of the present invention.

First, referring to FIG. 1 and FIG. 2, the tactile feedback device of the present invention has a housing 10 configuring the overall shape. The housing 10 comprises a body 12, a first cover 14, and a second cover 16. The transverse section of the body 12 is formed in a hexagon having a hollow space 12a and has opposite opened portions at top and bottom ends. The skin of the user, for example, his or her hand and/or finger, gets close to one end of the housing 10. For the transverse section of the body 12, the one formed in a hexagon is illustrated and described, but this is only illustrative, and it may be formed in various shapes such as a polygon, ellipse or circle.

The first and second covers 14 and 16 are mounted on opposite ends of the body 12 so as to close the space 12a. The first cover 14 has a plurality of holes 14a formed therethrough. The body 12 of the housing 10, the first and second cover 14 and 16 are made of magnetic material such as steel, for example.

Referring to FIG. 1 o 4, an actuator 20 is mounted inside the housing 10 to convert electric energy into kinetic energy. The actuator 20 includes a plurality of electromagnets 30 and return means 40. Cores 32 of electromagnets 30 are mounted in such a way that they can move vertically between a first position P1 and a second position P2 inside the housing 10 along its lengthwise direction, and are aligned with the holes 14a of the first cover 14. At one end of the cores 32 are formed holes 32a aligned with the holes 14a of the first cover 14. On the periphery close to one end of the cores 32 is formed a first flange 32b and at the other end is formed a second flange 32c. The cross section of the cores 32 may be formed in various shapes such as a circle and polygon. The core 32 is preferably made of magnetic material, and it may be made of non-magnetic material, as necessary.

The coils 34 of the electromagnets 30 are wound cylindrically on the outside of the cores 32 between first and second flanges 32b and 32c, and forms a magnetic field by the electric current applied from the power source. The coil 34 is connected to a connector 36 mounted on the periphery of the body 12. The connector 36 is a control means for controlling the electric current applied to the coil 34, and is connected to a controller 38, microprocessor and computer not shown in drawings.

Referring to FIGS. 2 to 4, FIG. 7 and FIG. 8, the return means 40 includes a plurality of magnets 42 that provide magnetic force so that the cores 32 of the electromagnets 30 are returned from the second position P2 to the first position P1, that is, the initial position. The magnets 42 are mounted on one surface of the second cover 16 so as to be aligned with the cores 32. The polarity of the magnet 42 is composed so as to generate repulsive force against the polarity that the core 32 has by forming a magnetic field.

Figure 3:
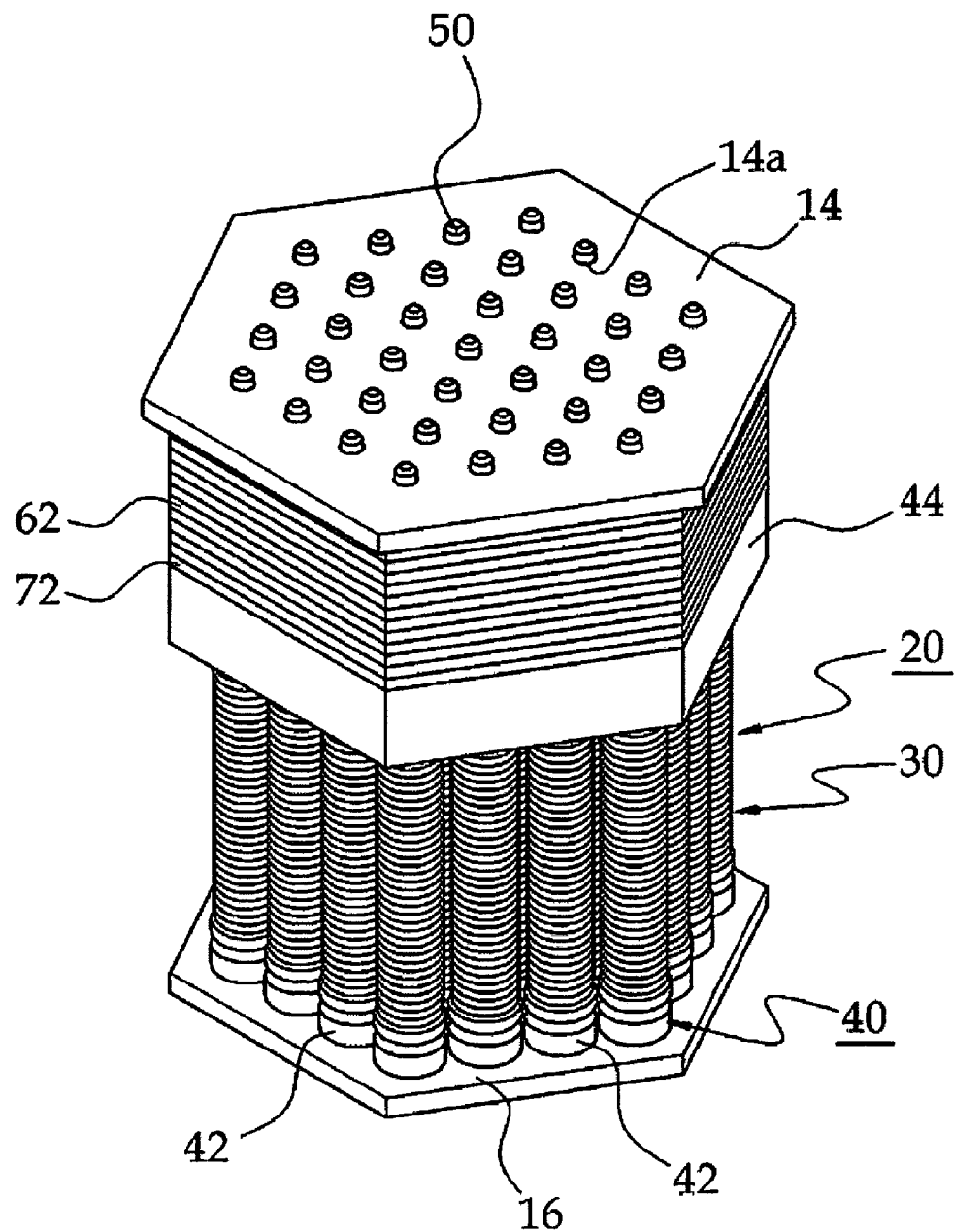
FIG. 3 is a perspective view showing the constitution in which an actuator, elastic means, linear motion guide, elastic means and main spacer are assembled in the tactile feedback device of the present invention.
Figure 4:
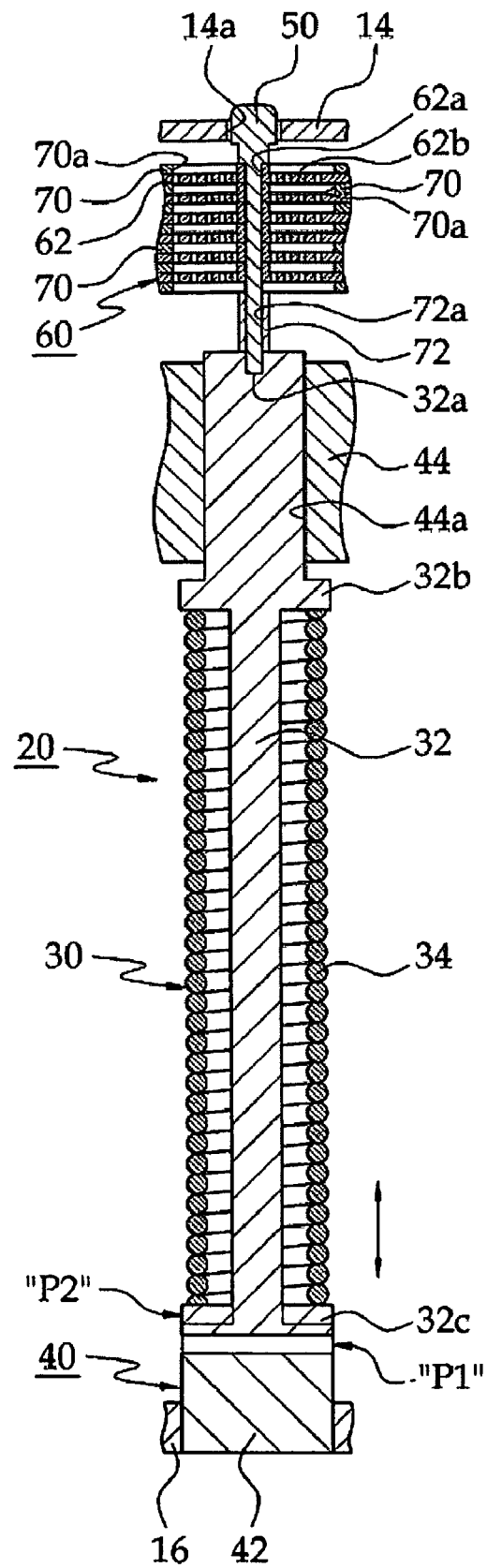
FIG. 4 is a sectional view showing the constitution in which the actuator, touch pins, elastic means, linear motion guide, elastic means and main spacer are assembled in the tactile feedback device of the present invention.
Figure 5:
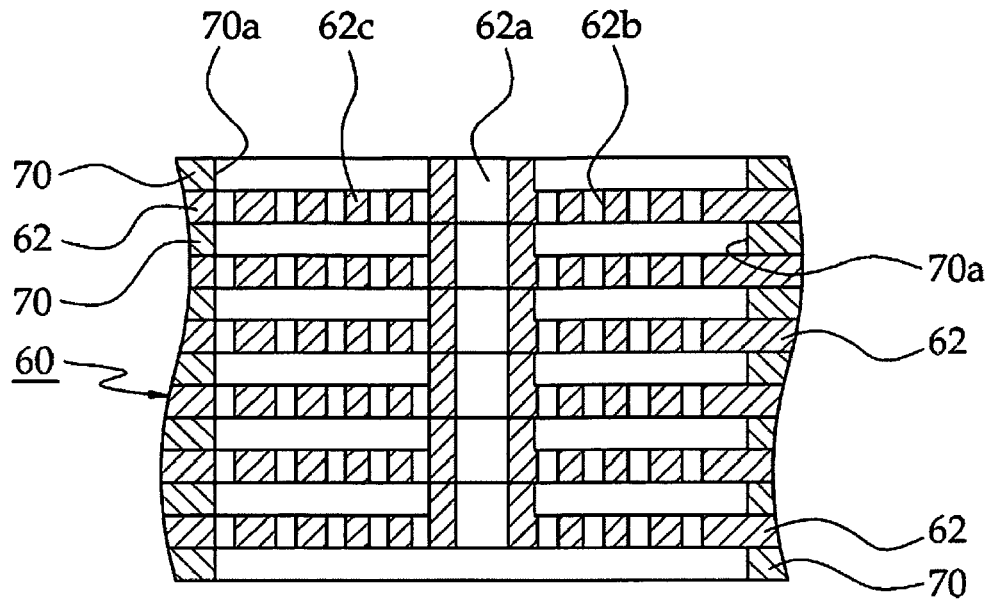
FIG. 5 is a partially sectional view showing the constitution of the elastic means and main spacers in the tactile feedback device of the present invention.

As shown in FIGS. 2 to 4, the actuator 20 is provided with a linear motion guide 44 that linearly guides the motion of the core 32. The linear motion guide 44 is mounted inside the housing 10 and has a plurality of guide holes 44a for one end of the cores 32 to be inserted to pass through. The transverse section of the linear motion guide 44 is formed in a hexagon corresponding to the transverse section of the housing 10 so as to prevent rotation inside the housing 10. In some embodiments, the return means 40 of the actuator 20 may be composed of such a return spring (not shown) mounted between the first flange 32b of the core 32 and the linear motion guide 44. Although not shown in drawings, the actuator 20 may be composed of a cylindrical coil that forms a magnetic field by the electric current applied from power source and a solenoid type actuator having a plunger mounted so as to move back and forth inside the coil.

Figure 7:
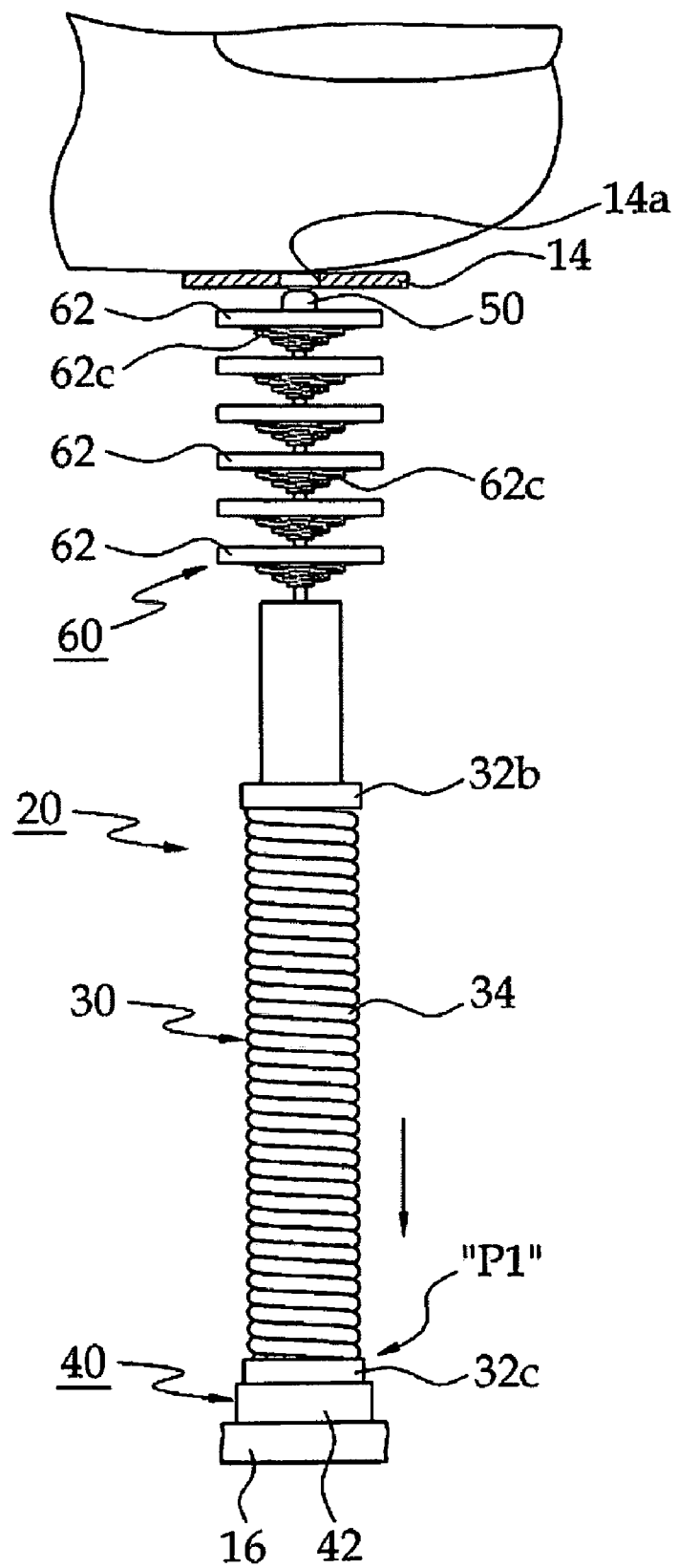
FIG. 7 is a schematic view showing an operation state in which the touch pins are popped into the housing in the tactile feedback device of the present invention.
Figure 8:
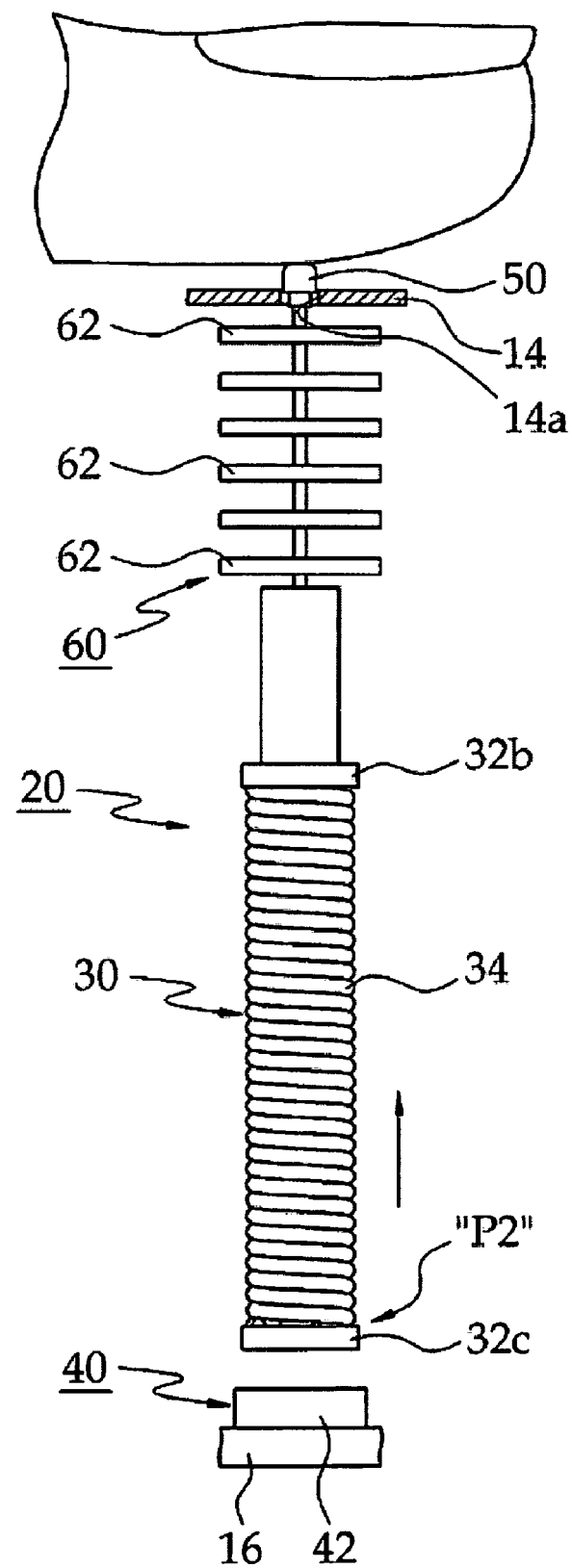
FIG. 8 is a schematic view showing an operation state in which the touch pins are popped out of the housing in the tactile feedback device of the present invention.

Referring to FIGS. 1 to 4, FIG. 7 and FIG. 8, the tactile feedback device of the present invention is provided with a plurality of touch pins 50 that are connected with the actuator 20 so as to be operated by kinetic energy of the actuator 20. The touch pins 50 are mounted so as to pop in and out of the holes 14a of the first cover 14. One end of the touch pins 50 (for example, the bottom end in FIG. 2) is combined with the hole 32a of the core 32. The other end of the touch pins 50 (for example, the top end in FIG. 2) is popped out of one end of the housing 10 through the hole 14a of the first cover 14 to be contacted to the skin of the user at the second position P2 of the core 32, and is popped into the housing 10 through the hole 14a of the first cover 14 at the first position P1 of the core 32. As described herein, the first position P1 is a position where the touch pins 50 are popped in lengthwise direction of the housing 10 as shown in FIG. 7, and the second position P2 is a position where the touch pins 50 are popped out of the housing 10 to contact with the finger as shown in FIG. 8.

Referring to FIGS. 2 to 5, and FIGS. 6A to 6K, the tactile feedback device of the present invention is provided with an elastic means 60 mounted between one end of the housing 10 and the actuator 20 so as to have elastic energy by elastic deformation when the touch pins 50 are popped into the housing 10. The elastic means 60 consists of one or more elastic plates 62. The elastic plate 62 may be made of synthetic rubber, plastic having elastic force, spring plate, etc. On the elastic plates 62 are formed a plurality of holes 62a, and around these holes 62a are formed slots 62b for elastic deformation of the elastic plate 62 to be possible in a smooth manner. The touch pins 50 are inserted through the holes 62a of the elastic plates 62. Accordingly, the elastic plates 62 are interlocked with the touch pins 50.

Figure 6A:
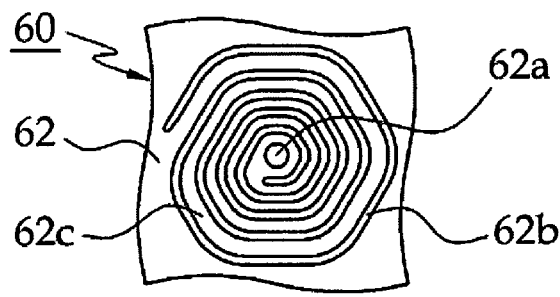
FIGS. 6A to 6K are partially sectional views showing the constitution of the elastic means in the tactile feedback device of the present invention.
Figure 6B:
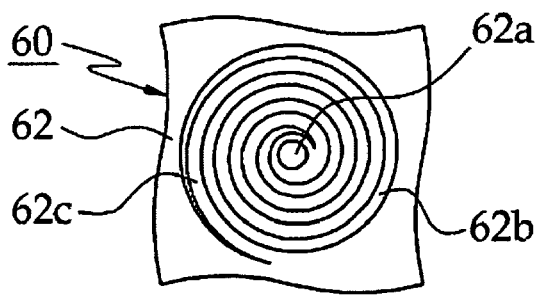
Figure 6C:
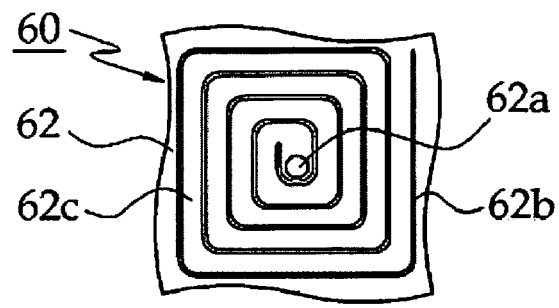
Figure 6D:
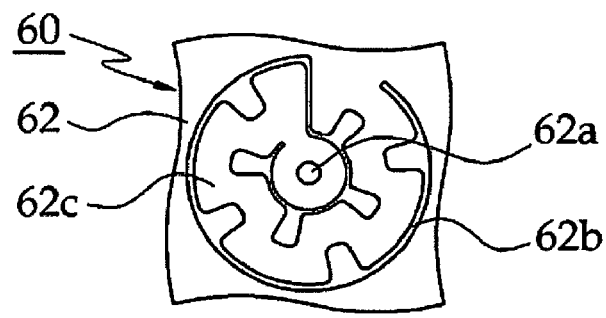
Figure 6E:
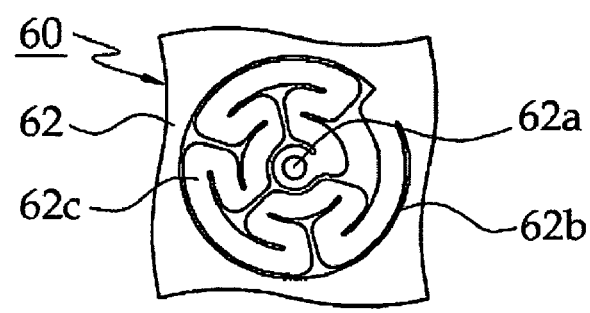
Figure 6F:
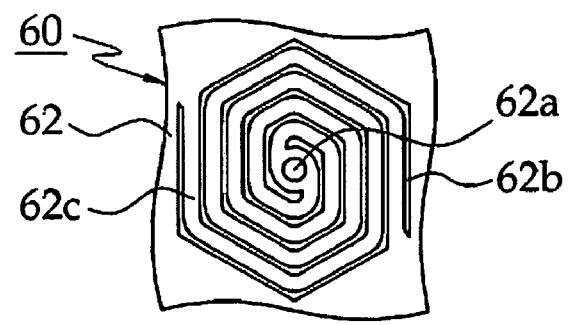
Figure 6G:
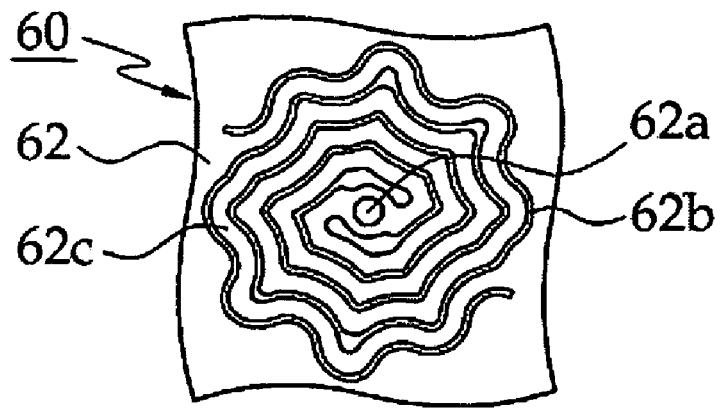
Figure 6H:
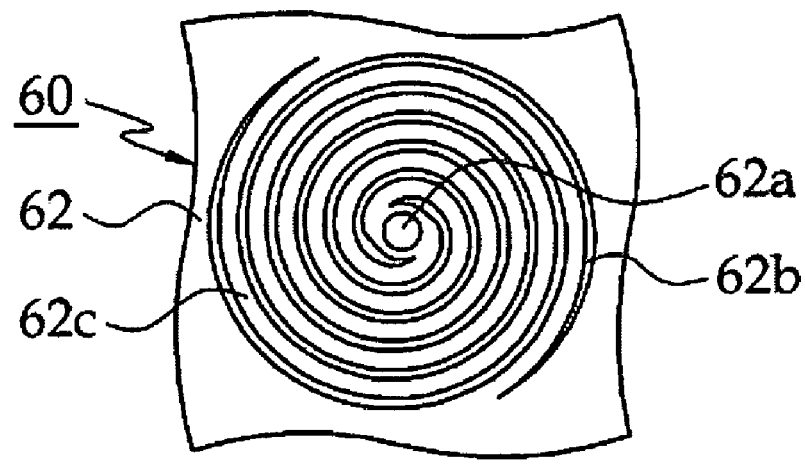
Figure 6I:
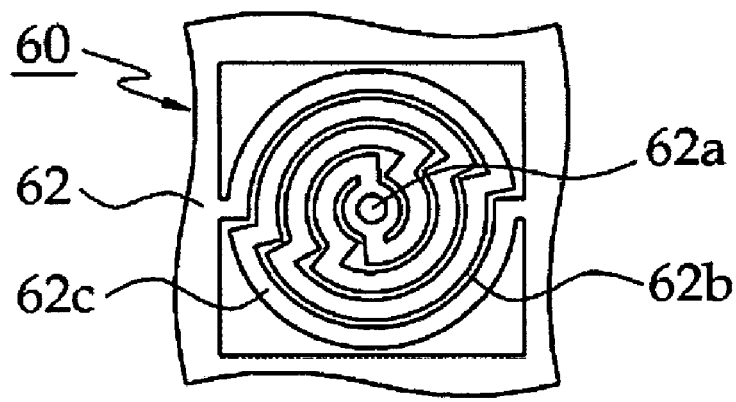
Figure 6J:
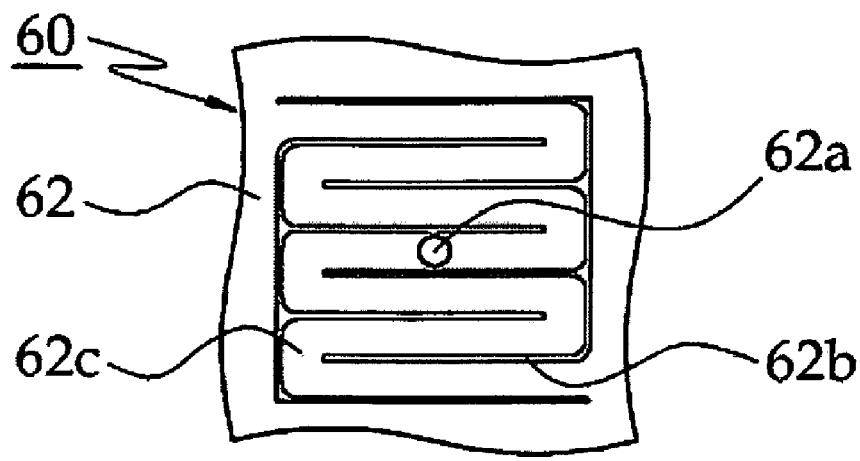
Figure 6K:
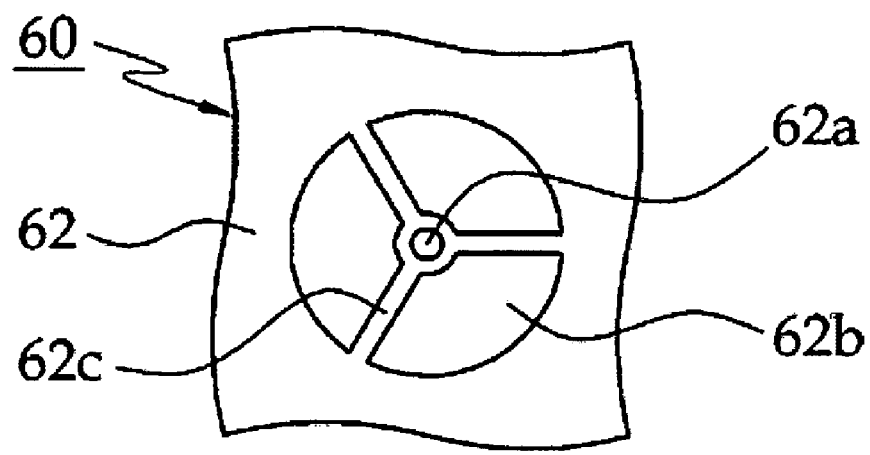

FIGS. 6A to 6I illustrate that the slot 62b of the elastic plate 62 is formed around the hole 62a in a spiral form. One point is supported by an elastic deformation portion 62c around the hole 62a illustrated in FIGS. 6A to 6E. FIG. 6J illustrates that the slot 62b of the elastic plate 62 is formed in a zigzag around the hole 62a. Two points are supported by an elastic deformation portion 62c around the holes 62a illustrated in FIGS. 6F to 6J. The elastic deformation portion 62c of the elastic plate 62 illustrated in FIG. 6K is formed in a rib shape extended radially around the hole 62a, and the slots 62b are formed in a hole shape between the elastic deformation portions 62c. Three points are supported by the elastic deformation portion 62c around the hole 62a illustrated in FIG. 6K.

Referring again to FIGS. 2 to 5, the elastic plates 62 can have a multi-layer structure in which a single layer or a plurality of layers are laminated therebetween. A plurality of elastic plates 62 are laminated at a given interval. The attractive force of the magnets 42 is greater than the elastic force that the laminated elastic plates 62 have. Therefore, the core 32 overcomes the elastic force of the elastic plates 62 by the attractive force of the magnets 42, and returns smoothly to the first position P1 from the second position P2. In the case that one point is supported by the elastic deformation portion 62c around the hole 62a illustrated in FIGS. 6A to 6E, each of the elastic plates 62 is laminated in such a way that the elastic deformation portion 62c forms an equal interval centering around each of the holes 62a. By dint of the fact that the elastic deformation portions 62c of the elastic plates 62 are arrayed at equal intervals, exact linear motion of the touch pins 50 is accomplished. Also in the case of two-point or three-point support structure of the elastic deformation portion 62C, each of the elastic plates 62 is laminated in such a way the elastic deformation portions 62c form equal intervals.

Referring again to FIGS. 2 to 5, main spacers 70 are interposed between elastic plates 62 to maintain intervals. In the main spacers 70 are formed holes 70a for the touch pins 50 to pass through. The diameters of the holes 70a are formed in such a size that the elastic plates 62 do not interfere with the main spacers 70. The main spacer 70 may be formed in a ring shape supporting the edge of the elastic plate 62. Also, the main spacer 70 may be substituted by a protruded portion protruding in a ring shape that allows elastic deformation of the elastic deformation portion 62c on the edge of one surface or both surfaces of the elastic plate 62. The respective transverse sections of the elastic plates 62 and main spacers 70 in FIG. 2 are formed in a hexagon corresponding to the transverse section of the body 12. The linear motion guide 44, elastic plates 62 and main spacers 70 may be forcibly inserted to fit in the space 12a of the body 12 or fixed by a fixing means, for example, adhesive agent or epoxy resin.

The elastic plates 62 of the elastic means 60 are placed between one end of the housing 10 and the linear motion guide 44. A plurality of subspacers 72 are mounted to maintain the interval between the elastic plate 62 of the lowermost layer of the elastic plates 62 and the linear motion guide 44. The respective touch pins 50 pass through the respective holes 72a of the subspacers 72.

Herein after, the action of the tactile feedback device according to the present invention having such a composition will be described.

Referring to FIG. 1, FIG. 3 and FIG. 7, when the current applied to the coils 34 of the electromagnets 30 by control of the controller 38 is cut off, the magnetic material, for example, the cores 32 made of steel, sticks to the magnets 42 by the attractive force of the acting magnets 42, and the touch pins 50 are popped into the housing 10 through the holes 14a of the first cover 14. At the first position P1 where the core 32 sticks to the magnet 42, the elastic deformation portion 62c of the elastic plate 62 is elastically deformed, so elastic energy is stored inside.

Referring to FIG. 3 and FIG. 8, if current is applied to the coils 34 of the electromagnets 30 by control of the controller 38 to form a magnetic field, the cores 32 are magnetized by the formed magnetic field so as to have polarity that has repulsive force of the magnets 42 provided. For example, if the magnets 42 generate magnetic force of N pole, the cores 32 are magnetized so as to have N pole.

By mutual action of magnetic force between the cores 32 and magnets 42, the cores 32 are moved from first position P1 to second position P2. The cores 32 are moved linearly along the guide holes 44a of the linear motion guides 44, so that the cores 32 and touch pins 50 are linearly moved together. Meanwhile, as mentioned above, when the current applied to the coils 34 is cut off, the front ends of the touch pins 50 are popped into housing 10 through the holes 14a of the first cover 14 and the cores 32 are returned to first position P1 from second position P2 by the attractive force of the magnets 42.

During the cores 32 are moved from first position P1 to second position P2, the elastic deformation portion 62c of the elastic plate 62 is returned by elastic energy stored therein to amplify the kinetic force of the touch pins 50 in conjunction with the linear motion of the touch pins 50. Since the kinetic force of the touch pins 50 is amplified by the repulsive force between the cores 32 and magnets 42 and the elastic energy of the elastic plate 62 like this, low-power driving of electromagnets 30 is possible. Also, since high output of touch pins 50 is possible also by the low-power driving of electromagnets 30, it is possible to easily miniaturize the tactile feedback device of the present invention.

When the cores 32 of electromagnets 30 reach the second position P2, the front ends of the touch pins 50 are popped out through the holes 14a of the first cover 14 to contact the skin of the user in use. The user can feel haptic sensation from stimulation of the skin by the touch pins 50. By interlocking of the actuator 20 and elastic means 60, the resolution for kinetic force of the touch pins 50 is enhanced, so controllability of the touch pins 50 can be improved. The controller 38 controls the cycle and intensity of the current applied to the coils 34 so as to make the user feel realistic touch sensation.

Meanwhile, in case of the cores 32 of electromagnets 30 are made of non-magnetic material, the cores 32 of non-magnetic material are magnetized when current is applied to the coils 34, so they stick to each of the magnets 42 by the attractive force of magnets 42. If the current applied to the coils 34 is cut off, the cores 32 of non-magnetic material come away from the magnets 42 by elastic energy of the elastic means 60 to be moved from first position P1 to second position P2.

As described above, by the tactile feedback device according to the present invention, the touch pins stimulate the skin of the user by dint of the actuator that converts electromagnetic energy into kinetic energy and the interlocking structure of the elastic means, so it is possible to accomplish realistic touch sensation. And additional effects are that the elastic energy of the elastic means amplifies the kinetic force of the touch pins to make low-power/high-output driving of actuator possible, and that it is possible to easily miniaturize and improve the controllability of the touch pins.

Although the present invention has been described in detail reference to its presently preferred embodiment, it will be understood by those skilled in the art that various modifications and equivalents can be made without departing from the spirit and scope of the present invention, as set forth in the appended claims.

What is claimed is:

1. A tactile feedback device comprising:
a housing which has one end positioned near a user's skin;
an actuator which is mounted inside said housing to convert electromagnetic energy into kinetic energy;
touch pins having front ends which are mounted in such a way that they can pop into and out of said housing, the front ends of which are protruded from one end of said housing to contact the user's skin, and which are connected to said actuator so as to be operated by kinetic energy of said actuator; and
an elastic means which is mounted between one end of said housing and said actuator, into which said touch pins fixedly pass through so as to be interlocked with said touch pins, and which is elastically deformed to have elastic energy when said touch pins are popped into said housing.

2. The device of claim 1, wherein said housing comprises a body having a space in which said actuator, said touch pins and said elastic means are mounted; a first cover which is mounted at one end of said housing and in which holes are formed for said touch pins to pass through; and a second cover which is mounted at the other end of said housing.

3. The device of claim 1 or 2, wherein said actuator mounted inside said housing and combined with said touch pins comprises cores which move between a first position where said touch pins are popped in lengthwise direction of said housing and a second position where said touch pins are popped out of said housing; a plurality of electromagnets having coils which are wound on a periphery of said cores to form a magnetic field operative to move said cores between said first position and said second position by applying current; and a return means which returns said cores from said second position to said first position.

4. The device of claim 3, wherein said return means includes a plurality of magnets each having a polarity which are mounted so as to be close to said cores in an opposite direction of said touch pins, and the polarity of said magnets is composed in such a way that repulsive force is generated by said magnetic field against the polarity that said cores have.

5. The device of claim 4, wherein said actuator further comprises a linear motion guide which is mounted inside said housing so as to guide said core to linear motion, and said linear motion guide has a guide hole for said core to be inserted into to be guided.

6. The device of claim 5, wherein said elastic means is disposed between one end of said housing and said linear motion guide, and has subspacers, into which said touch pins pass through, mounted to maintain intervals between said elastic means and said linear motion guide.

7. The device of claim 1, wherein said elastic means consists of elastic plates, and said elastic plates have a plurality of holes into which said touch pins fixedly pass through, and slots are formed around the holes of said elastic plates for the elastic deformation.

8. The device of claim 7, wherein a plurality of said elastic plates are laminated, and main spacers are interposed respectively to maintain intervals between said elastic plates.

9. The device of claim 8, wherein each of said elastic plates has an elastic deformation portion supported at one point around said hole by the forming of said slot, and each of said elastic plates is laminated in such a way that said elastic deformation portion forms an equal interval centering around each of said holes.

* * * * *